United States Patent
Li et al.

(10) Patent No.: US 10,203,798 B2
(45) Date of Patent: Feb. 12, 2019

(54) TOUCH SCREEN, TOUCH DISPLAY APPARATUS AND METHOD FOR MANUFACTURING TOUCH SCREEN

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Kefeng Li, Beijing (CN); Xianlin Ding, Beijing (CN); Ting Zeng, Beijing (CN); Zhongzheng Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 37 days.

(21) Appl. No.: 15/197,415

(22) Filed: Jun. 29, 2016

(65) Prior Publication Data

US 2017/0192583 A1    Jul. 6, 2017

(30) Foreign Application Priority Data

Jan. 5, 2016  (CN) .......................... 2016 1 0007008

(51) Int. Cl.
 *G06F 3/042* (2006.01)
 *G06F 3/041* (2006.01)
(52) U.S. Cl.
 CPC .......... *G06F 3/0416* (2013.01); *G06F 3/0412* (2013.01); *G06F 3/0421* (2013.01); *G06F 3/0428* (2013.01); *G06F 2203/04103* (2013.01)

(58) Field of Classification Search
 None
 See application file for complete search history.

(56) References Cited

U.S. PATENT DOCUMENTS

2012/0098794 A1    4/2012  Kleinert et al.

FOREIGN PATENT DOCUMENTS

| CN | 1647100 A | 7/2005 |
|---|---|---|
| CN | 201489504 U | 5/2010 |
| CN | 102138118 A | 7/2011 |
| CN | 104094204 A | 10/2014 |

(Continued)

OTHER PUBLICATIONS

Office Action in Chinese Application No. 201610007008.X dated Dec. 5, 2016, with English translation. 7 pages.

(Continued)

*Primary Examiner* — Gustavo Polo
(74) *Attorney, Agent, or Firm* — Womble Bond Dickinson (US) LLP

(57) ABSTRACT

The present disclosure provides a touch screen, a touch display apparatus and a method for manufacturing a touch screen so as to improve the positioning precision of the touch screen. The touch screen comprises a substrate and a plurality of first optical devices, a plurality of second optical devices, a light source, a third optical device, a plurality of first light-receiving means and a plurality of second light-receiving means. The touch screen further comprises control means for determining positional information of the touch point according to the light receiving results of the plurality of first light-receiving means and the plurality of second light-receiving means.

20 Claims, 7 Drawing Sheets

(56) References Cited

FOREIGN PATENT DOCUMENTS

| CN | 104991685 A | 10/2015 |
|---|---|---|
| JP | 2009198360 A | 9/2009 |
| WO | WO 2003077192 A1 | 9/2003 |

OTHER PUBLICATIONS

Office Action in Chinese Application No. 2016100070008.X with English translation. 7 pages, 201610007008X, dated Jan. 5, 2016.
Office Action in Chinese Application No. 201610007008.X dated Jun. 22, 2016, with English translation. 7 pages.
Office Action in Chinese Application No. 201610007008.X dated May 17, 2016, with English translation.

pulse laser emitted by the light source:

pulse laser received by the first light-receiving means:

pulse laser received by the second light-receiving means pulse laser emitted by the light source:

pulse laser received by the first light-receiving means:

$H_1 \sim H_{\alpha-1}$:

$H_\alpha$:

$H_{\alpha+1} \sim H_m$:

pulse laser received by the second light-receiving means:

$V_1 \sim V_{\beta-1}$:

$V_\beta$:

$V_{\beta+1} \sim V_n$:

S701
forming, on a substrate, an accommodating space for arranging the first optical devices, the second optical devices, the third optical device, the light source, the first light-receiving means and the second light-receiving means

S702
arranging the first optical devices, the second optical devices, the third optical device, the light source, the first light-receiving means and the second light-receiving means within the accommodating space

S703
mounting a glass cover plate on the substrate where the first optical devices, the second optical devices, the third optical device, the light source, the first light-receiving means and the second light-receiving means have been arranged, forming a touch screen

Fig.7

TOUCH SCREEN, TOUCH DISPLAY APPARATUS AND METHOD FOR MANUFACTURING TOUCH SCREEN

RELATED APPLICATIONS

The present application claims the benefit of Chinese Patent Application No. 201610007008.X, filed on Jan. 5, 2016, the entire disclosure of which is incorporated herein by reference.

FIELD

The present disclosure relates to the field of touch display technologies, and particularly to a touch screen, a touch display apparatus and a method for manufacturing a touch screen.

BACKGROUND

Touch screen, as an input medium, provides the user with better convenience than keyboards and mouse. Meanwhile, the pros and cons of its performance also directly impact on the consumer's actual experience.

At present, touch screens in the market are usually mutual-capacitance touch screens. The mutual-capacitance touch screen comprises a set of driving electrode lines and a set of probing electrode lines which intersect each other and are insulated from each other. When there are n (n denotes a natural number above 1) driving electrode lines and m (m denotes a natural number above 1) probing electrode lines, m+n electrode wirings need to be conductively connected to a flexible printed circuit board (abbreviated to FPC), respectively. The basic principle of the mutual-capacitance touch screen is: applying a voltage to the driving electrode lines, detecting change in signals of the probing electrode lines. The driving electrode lines determine the X-coordinate and the probing electrode lines determine the Y-coordinate. Upon detection, progressive scanning is performed for the driving electrode lines in the X-direction. At the time of scanning each row of driving electrode line, the signal on each probing electrode line is read. Through a round of scanning, the intersections of every rows and columns can be scanned, and m*n signals are scanned in all. Such detection manner can specifically determine the coordinates of multiple points, and can hence enable multipoint touch. The equivalent circuit model comprises, as shown in FIG. 1, a signal source 101, a driving electrode line resistor 103, a mutual capacitor 102 between the driving electrode line and the probing electrode line, a parasitic capacitor 104 between the driving electrode line, the probing electrode line and the common electrode layer, a probing electrode line resistor 105 and a detection circuit 106. When a finger touches, part of the current flows into the finger, which is equivalent to change in the mutual capacitance between the driving electrode line and the probing electrode line. By detecting the resulting tiny current change at a detection end, the coordinates of multiple points can be determined.

The prior art suffers from the deficiencies of poor positioning precision and low scanning frequency resulting from the touch detection using the above principle.

SUMMARY

It is an objective of the present disclosure to provide a touch screen, a touch display apparatus and a method for manufacturing a touch screen, which at least partly alleviate or even eliminate one or more deficiencies in the prior art.

Embodiments of the present disclosure provide a touch screen comprising a substrate and a plurality of first optical devices, a plurality of second optical devices, a light source, a third optical device, a plurality of first light-receiving means and a plurality of second light-receiving means arranged on the substrate, wherein the plurality of first optical devices and the plurality of first light-receiving means are positionally opposite to each other respectively and are arranged in a first side area and a second side area opposite to each other on the substrate, respectively. The plurality of second optical devices and the plurality of second light-receiving means are positionally opposite to each other respectively and are arranged in a third side area and a fourth side area opposite to each other on the substrate, respectively. The light source is located at a convergence of the first side area and the fourth side area, and the third optical device is located at a convergence of the first side area and the third side area. The light source emits light rays towards the first side area, and the first optical device reflects light rays to a corresponding first light-receiving means and transmits light rays to an adjacent first optical device away from the light source. The third optical device reflects light rays to the plurality of second optical devices, and the second optical device reflects light rays to a corresponding second light-receiving means and transmits light rays to an adjacent second optical device away from the third optical device. The touch screen further comprises control means. The control means is in signal connection with the plurality of first light-receiving means and the plurality of second light-receiving means respectively for determining positional information of a touch point according to light receiving results of the plurality of first light-receiving means and the plurality of second light-receiving means.

In the touch screen provided by embodiments of the present disclosure, when the user's finger touches the screen, it blocks propagation of the light rays emitted by the light source at the position of the touch point, thus the first light-receiving means and the second light-receiving means corresponding to the position of the touch point cannot receive light rays. The control means determines the position of the user's touch point according to the positions of the first light-receiving means and the second light-receiving means that cannot receive light rays, thereby realizing precise positioning. Furthermore, the touch screen according to embodiments of the present disclosure employs an optical scan array, and the scanning frequency thereof has been significantly increased as compared to the prior art.

In some embodiments, the plurality of first optical devices are transflective prisms, a second optical device in the third side area farthest from the third optical device is a total reflective prism, the remaining second optical devices are transflective prisms, and the third optical device is a total reflective prism.

Specifically, the transflective prism comprises two isosceles right-angled triangular prisms which are pieced together to exhibit a regular quadrangular shape; the total reflective prism comprises an isosceles right-angled triangular prism.

In some embodiments, the plurality of first optical devices are transflective coated lenses, a second optical device in the third side area farthest from the third optical device is a total reflective coated lens, the remaining second optical devices are transflective coated lenses, and the third optical device is a total reflective coated lens.

In some embodiments, the transflective coated lens comprises a plane mirror and a transflective film layer arranged on a surface of the plane mirror, the transflective film layer facing the direction in which the light source emits light rays. The total reflective coated lens comprises a plane mirror and a total reflective film layer arranged on a surface of the plane mirror, the total reflective film layer facing the direction in which the light source emits light rays.

In some embodiments, as the distances between the plurality of first optical devices and the light source increase, the transmissivities of the plurality of first optical devices decrease successively and the reflectivities of the plurality of first optical devices increase successively; as the distances between the plurality of second optical devices and the light source increase, the transmissivities of the plurality of second optical devices decrease successively and the reflectivities of the plurality of second optical devices increase successively.

In some embodiments, at least one secondary light source that emits light rays in the same direction as the light source is further arranged between the plurality of first optical devices, and/or at least one secondary light source that emits light rays in the same direction as the light source is further arranged between the plurality of second optical devices.

Alternatively, the light source comprises a light-emitting diode or a laser emitter.

In some embodiments, when the light source is a laser emitter, the laser emitter is a pulse laser emitter. When the user's finger does not touch the screen, the waveforms of the pulse laser received by the first light-receiving means and the second light-receiving means are consistent with the waveform of the pulse laser emitted by the laser emitter. When the user's finger touches the screen, the first light-receiving means and the second light-receiving means corresponding to the touch point cannot receive pulse laser. The control means determines information of the touch point according to the positions of the first light-receiving means and the second light-receiving means that cannot receive pulse laser, thereby enabling precise positioning.

Specifically, the first light-receiving means and the second light-receiving means are photoelectric sensors, respectively.

Embodiments of the present disclosure provide a touch display apparatus comprising the touch screen according to any one of the above technical solutions. The touch display apparatus has a higher scanning frequency and higher positioning precision.

Embodiments of the present disclosure further provide a method for manufacturing the touch screen according to any one of the above technical solutions, comprising:

forming, on a substrate, an accommodating space for arranging the first optical devices, the second optical devices, the third optical device, the light source, the first light-receiving means and the second light-receiving means;

arranging the first optical devices, the second optical devices, the third optical device, the light source, the first light-receiving means and the second light-receiving means within the accommodating space;

mounting a glass cover plate on the substrate where the first optical devices, the second optical devices, the third optical device, the light source, the first light-receiving means and the second light-receiving means have been arranged to form a touch screen.

The touch screen manufactured by said method has a higher scanning frequency and also higher positioning precision.

BRIEF DESCRIPTION OF DRAWINGS

FIG. 7 is a flow chart of a method for manufacturing a touch screen according to embodiments of the present disclosure.

DETAILED DESCRIPTION

Figure 1:
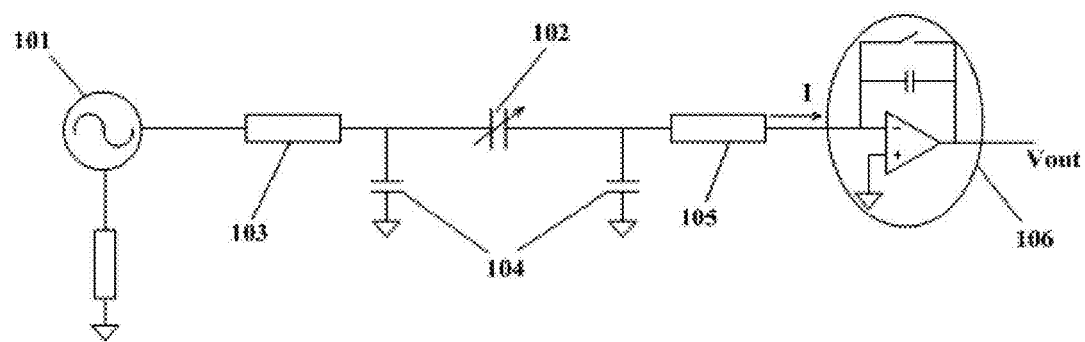
FIG. 1 is a schematic diagram of an equivalent circuit model of a mutual-capacitance touch screen.

In order to improve the positioning precision of the touch screen and increase the scanning frequency thereof, embodiments of the present disclosure provide a touch screen, a touch display apparatus and a method for manufacturing a touch screen.

In the drawings, the reference signs below are used:
101—signal source
102—mutual capacitor
103—driving electrode line resistor
104—parasitic capacitor
105—probing electrode line resistor
106—detection circuit
1—first optical device
2—second optical device
3—third optical device
4—first light-receiving means
5—second light-receiving means
6—light source
10—first side area
20—second side area
30—third side area
40—fourth side area
100—substrate.

Figure 2:
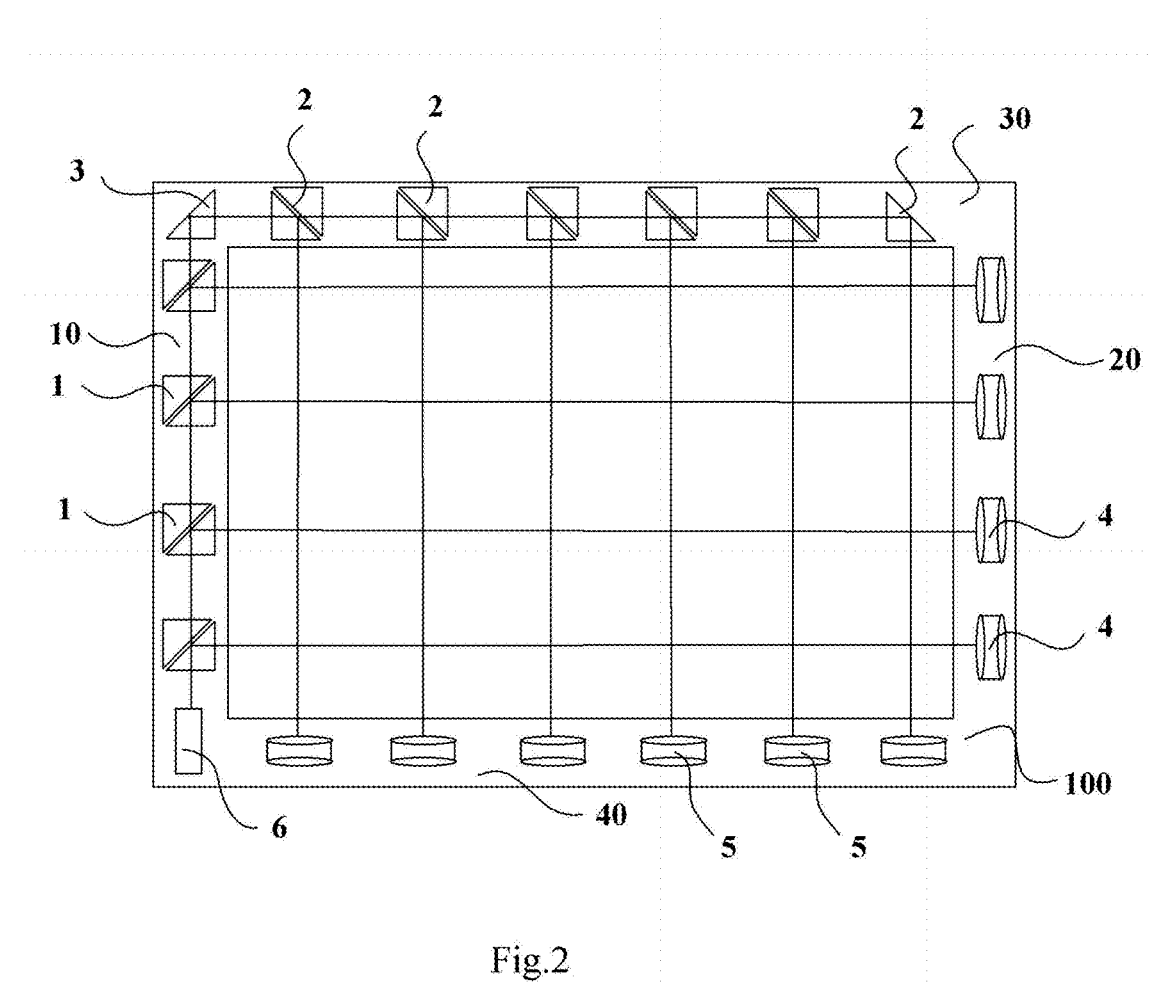
FIG. 2 is a structural schematic diagram of a touch screen according to an embodiment of the present disclosure.

As shown in FIG. 2, embodiments of the present disclosure provide a touch screen comprising a substrate 100 and a plurality of first optical devices 1, a plurality of second optical devices 2, a light source 6, a third optical device 3, a plurality of first light-receiving means 4 and a plurality of second light-receiving means 5 arranged on the substrate 100. The plurality of first optical devices 1 and the plurality of first light-receiving means 4 are positionally opposite to each other respectively and are arranged in a first side area 10 and a second side area 20 opposite to each other on the substrate, respectively. The plurality of second optical devices 2 and the plurality of second light-receiving means 5 are positionally opposite to each other respectively and are arranged in a third side area 30 and a fourth side area 40 opposite to each other on the substrate, respectively. The light source 6 is located at a convergence of the first side area 10 and the fourth side area 40, and the third optical device 3 is located at a convergence of the first side area 10 and the third side area 30. The light source 6 emits light rays towards the first side area 10. The first optical device 1 reflects light rays to a corresponding first light-receiving means 4 and transmits light rays to an adjacent first optical device away from the light source. The third optical device 3 reflects light rays to the plurality of second optical devices 2. The second optical device 2 reflects light rays to a corresponding second light-receiving means 5 and transmits light rays to an adjacent second optical device away from the third optical device. The touch screen further comprises control means (not shown). The control means is in signal connection with the plurality of first light-receiving means 4 and the plurality of second light-receiving means 5 respectively for determining positional information of the touch point according to the light-receiving results of the plurality of first light-receiving means 4 and the plurality of second light-receiving means 5.

Figure 4:
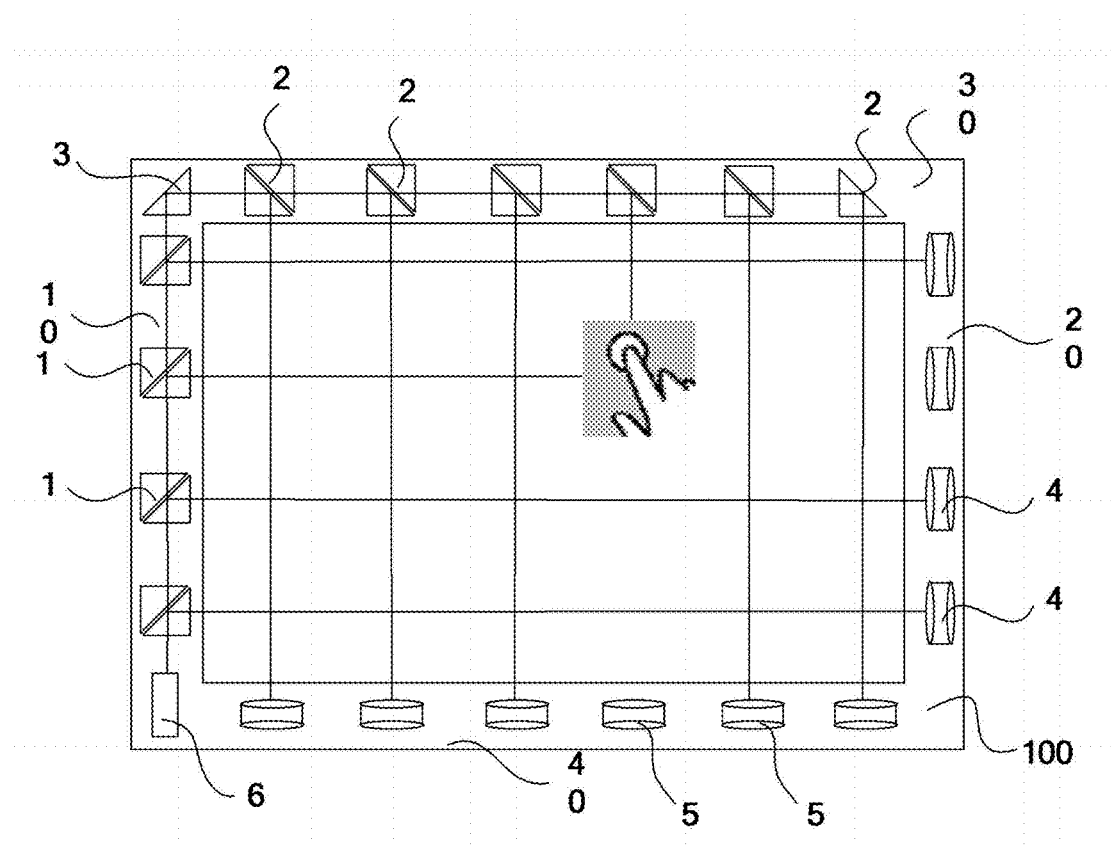
FIG. 4 is a schematic diagram when a finger touches the screen according to embodiments of the present disclosure.

In the touch screen provided by embodiments of the present disclosure, as shown in FIG. 4, when the user's finger touches the screen, it blocks propagation of the light rays emitted by the light source at the position of the touch point, thus the first light-receiving means 4 and the second light-receiving means 5 corresponding to the position of the touch point cannot receive light rays. The control means determines positional information of the user's touch point according to the positions of the first light-receiving means 4 and the second light-receiving means 5 that cannot receive light rays, thereby enabling precise positioning. Furthermore, the touch screen according to embodiments of the present disclosure employs an optical scan array, and the scanning frequency thereof has also been significantly increased as compared to the prior art.

It is worth mentioning that in respective embodiments of the present disclosure, the object that touches the screen is only exemplified by a finger of a user, but not limited to a finger. Any non-transmissive object can realize touch of the screen. Embodiments of the present disclosure greatly improve the convenience of the user's operation of the touch screen as compared to the prior art in which the objects that enable touch of the mutual-capacitance touch screen are limited to objects that can form a coupling capacitor with the touch screen. For example, in a cold winter, the user can operate a mobile phone with gloves on. However, for the existing mutual-capacitance touch screen, the user needs to operate a mobile phone with gloves off. From this it can be seen that the touch screen provided by embodiments of the present disclosure provides great convenience for the user's touch operation.

In an embodiment of the present disclosure, as shown in FIG. 2, the plurality of first optical devices 1 are transflective prisms, the second optical device 2 in the third side area 30 farthest from the third optical device 3 is a total reflective prism, the remaining second optical devices 2 are transflective prisms, and the third optical device 3 is a total reflective prism. Specifically, the structure of the transflective prism may be two isosceles right-angled triangular prisms pieced together to exhibit a regular quadrangular shape, and the structure of the total reflective prism may be an isosceles right-angled triangular prism.

Figure 3:
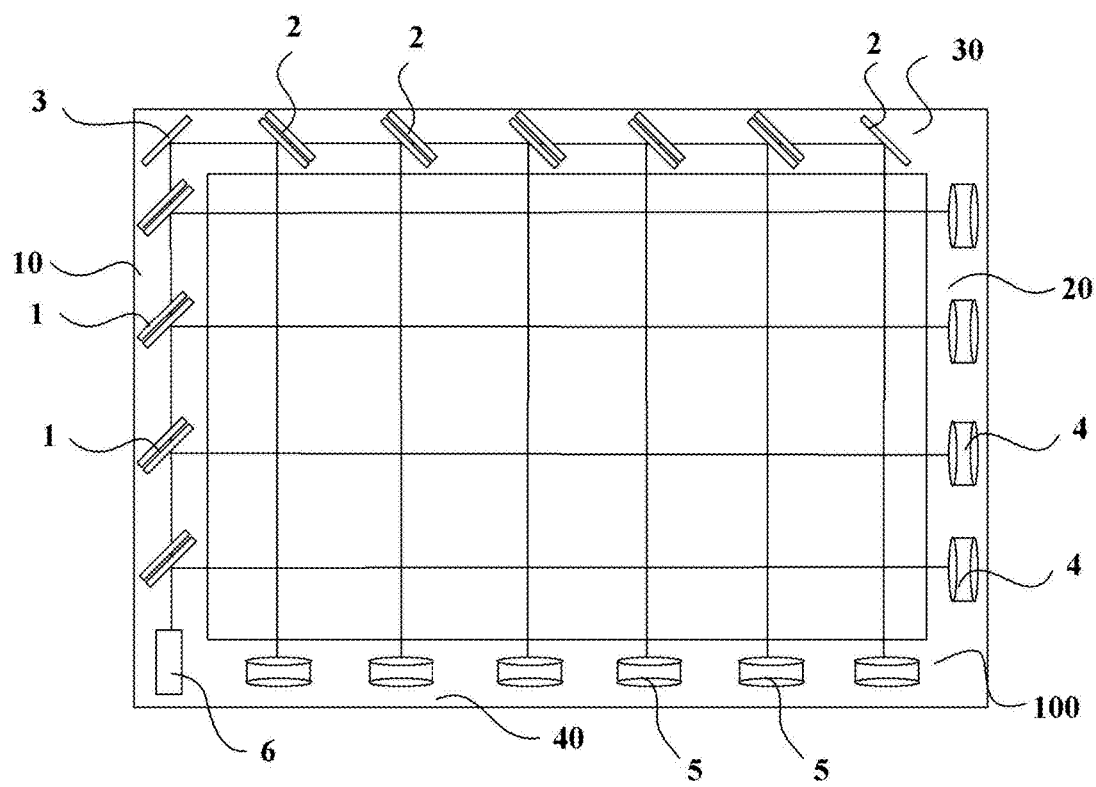
FIG. 3 is a structural schematic diagram of a touch screen according to another embodiment of the present disclosure.

In another embodiment of the present disclosure, as shown in FIG. 3, the plurality of first optical devices 1 are transflective coated lenses, the second optical device 2 in the third side area 30 farthest from the third optical device 3 is a total reflective coated lens, the remaining second optical devices 2 are transflective coated lenses, and the third optical device 3 is a total reflective coated lens.

The transflective coated lens comprises a plane mirror and a transflective film layer arranged on a surface of the plane mirror, the transflective film layer facing the direction in which the light source emits light rays. Similarly, the total reflective coated lens also comprises a plane mirror and a total reflective film layer arranged on a surface of the plane mirror, the total reflective film layer facing the direction in which the light source emits light rays.

It is to be noted that the transflective concept mentioned in respective embodiments of the present disclosure indicates that light is partially transmitted and partially reflected, while it is not limited to the specific ratio of 50% transmitted light to 50% reflected light.

In some embodiments, as the distances between the plurality of first optical devices and the light source increase, the transmissivities of the plurality of first optical devices decrease successively and the reflectivities of the plurality of first optical devices increase successively. As the distances between the plurality of second optical devices and the light source increase, the transmissivities of the plurality of second optical devices decrease successively and the reflectivities of the plurality of second optical devices increase successively. With such design, the light intensity of the reflected light rays can remain relatively stable, and the first light-receiving means and the second light-receiving means can stably receive the reflected light rays, which further facilitates realization of the stability of the optical touch.

In an embodiment of the present disclosure, at least one secondary light source that emits light rays in the same direction as the light source is further arranged between the plurality of first optical devices, and/or at least one secondary light source that emits light rays in the same direction as the light source is further arranged between the plurality of second optical devices. The arrangement of secondary light sources can ensure that the transmitted light and the reflected light both have an adequate light intensity in the light propagation direction, which facilitates realization of an optical scan array and enablement of precise positioning.

In respective embodiments of the present disclosure, the specific type of the light source is not limited, which may, for example, be a light-emitting diode or laser emitter. When the light source is a laser emitter, the laser emitter may employ a pulse laser emitter. The specific types of the first light-receiving means and the second light-receiving means are not limited, either, which may both employ a photoelectric sensor.

The propagation process of pulse laser is analyzed below in detail by only taking the example that the light source is a pulse laser emitter. In the present embodiment, we specify the direction parallel to the first side area and the second side area as an H direction, and the direction parallel to the third side area and the fourth side area as a V direction. There are m first light-receiving means in the H direction and n second light-receiving means in the V direction.

Figure 5:
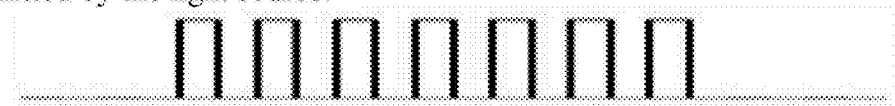
FIG. 5 is a schematic diagram of emitting pulse laser and receiving pulse laser when a finger does not touch the screen according to embodiments of the present disclosure.
Figure 5:
Figure 5:
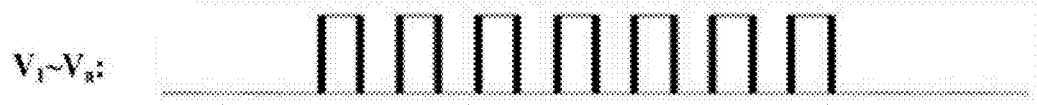
Figure 6:
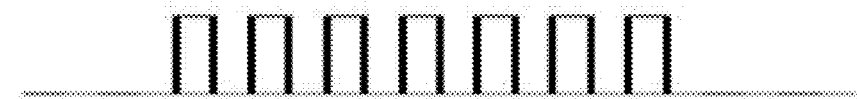
FIG. 6 is a schematic diagram of emitting pulse laser and receiving pulse laser when a finger touches the screen according to embodiments of the present disclosure.
Figure 6:
Figure 6:
Figure 6:
Figure 6:
Figure 6:
Figure 6:

As shown in FIG. 5, when the user's finger does not touch the screen, the waveforms of the pulse laser received by the first light-receiving means and the second light-receiving means are consistent with the waveform of the pulse laser emitted by the laser emitter. As shown in FIG. 6, when the user's finger touches the screen, it is not difficult to find that the α-th first light-receiving means and the β-th second light-receiving means cannot receive pulse laser. The control means determines that the coordinates of the touch point are (α, β) according to the positions of the first light-receiving means and the second light-receiving means which cannot receive pulse laser, thereby enabling precise positioning.

Embodiments of the present disclosure further provide a touch display apparatus comprising the touch screen according to any one of the above embodiments. The touch display device has a higher scanning frequency and higher positioning precision.

The specific type of the touch display apparatus is not limited, which may, for example, be any product or component having touch display function such as liquid crystal panel, electronic paper, OLED panel, liquid crystal television, liquid crystal display, digital frame, cell phone, tablet computer, and so on.

Embodiments of the present disclosure further provide a method for manufacturing the touch screen according to any one of the above embodiments, as shown in FIG. 7.

At step S701, an accommodating space is formed on a substrate for arranging the first optical devices, the second optical devices, the third optical device, the light source, the first light-receiving means and the second light-receiving means.

At step S702, the first optical devices, the second optical devices, the third optical device, the light source, the first light-receiving means and the second light-receiving means are arranged within the accommodating space.

At step S703, a glass cover plate is mounted on the substrate where the first optical devices, the second optical devices, the third optical device, the light source, the first light-receiving means and the second light-receiving means have been arranged, forming a touch screen.

The touch screen manufactured by said method has a higher scanning frequency and also higher positioning precision.

Obviously, those skilled in the art can make various modifications and variations to the present disclosure without departing from the spirit and scope thereof. In this way, if these modifications and variations to the present disclosure belong to the scope of the claims of the present disclosure and equivalent technologies thereof, the present disclosure also intends to encompass these modifications and variations.

The invention claimed is:

1. A touch screen, comprising a substrate and a plurality of first optical devices, a plurality of second optical devices, a light source, a third optical device, a plurality of first light-receiving means and a plurality of second light-receiving means arranged on the substrate, wherein
   the plurality of first optical devices and the plurality of first light-receiving means are positionally opposite to each other respectively and are arranged in a first side area and a second side area opposite to each other on the substrate, respectively, the plurality of second optical devices and the plurality of second light-receiving means are positionally opposite to each other respectively and are arranged in a third side area and a fourth side area opposite to each other on the substrate, respectively; the light source is located at a convergence of the first side area and the fourth side area, the third optical device is located at a convergence of the first side area and the third side area;
   the light source emits light rays towards the first side area, the first optical device reflects light rays to a corresponding first light-receiving means and transmits light rays to an adjacent first optical device away from the light source; the third optical device reflects light rays to the plurality of second optical devices, the second optical device reflects light rays to a corresponding second light-receiving means and transmits light rays to an adjacent second optical device away from the third optical device;
   the touch screen further comprising control means, the control means being in signal connection with the plurality of first light-receiving means and the plurality of second light-receiving means respectively for determining positional information of a touch point according to light receiving results of the plurality of first light-receiving means and the plurality of second light-receiving means,
   wherein the plurality of first optical devices are transflective optical devices, a second optical device in the third side area farthest from the third optical device is a total reflective optical device, the remaining second optical devices are transflective optical devices, the third optical device is a total reflective optical device.

2. The touch screen according to claim 1, wherein the plurality of first optical devices are transflective prisms, a second optical device in the third side area farthest from the third optical device is a total reflective prism, the remaining second optical devices are transflective prisms, the third optical device is a total reflective prism.

3. The touch screen according to claim 2, wherein,
   the transflective prism comprises two isosceles right-angled triangular prisms which are pieced together to exhibit a regular quadrangular prism shape; the total reflective prism comprises an isosceles right-angled triangular prism.

4. The touch screen according to claim 1, wherein the plurality of first optical devices are transflective coated lenses, a second optical device in the third side area farthest from the third optical device is a total reflective coated lens, the remaining second optical devices are transflective coated lenses, the third optical device is a total reflective coated lens.

5. The touch screen according to claim 4, wherein the transflective coated lens comprises a plane mirror and a transflective film layer arranged on a surface of the plane mirror, the transflective film layer facing a direction in which the light source emits light rays; the total reflective coated lens comprises a plane mirror and a total reflective film layer arranged on a surface of the plane mirror, the total reflective film layer facing a direction in which the light source emits light rays.

6. The touch screen according to claim 1, wherein as distances between the plurality of first optical devices and the light source increase, transmissivities of the plurality of first optical devices decrease successively and reflectivities of the plurality of first optical devices increase successively; as distances between the plurality of second optical devices and the light source increase, transmissivities of the plurality of second optical devices decrease successively and reflectivities of the plurality of second optical devices increase successively.

7. The touch screen according to claim 6, wherein at least one secondary light source that emits light rays in the same direction as the light source is further arranged between the plurality of first optical devices, and/or at least one secondary light source that emits light rays in the same direction as the light source is further arranged between the plurality of second optical devices.

8. The touch screen according to claim 1, wherein the light source comprises a light-emitting diode or a laser emitter.

9. The touch screen according to claim 8, wherein when the light source is a laser emitter, the laser emitter is a pulse laser emitter.

10. The touch screen according to claim 1, wherein the first light-receiving means and the second light-receiving means are photoelectric sensors, respectively.

11. A touch display apparatus comprising a touch screen, the touch screen comprising a substrate and a plurality of first optical devices, a plurality of second optical devices, a light source, a third optical device, a plurality of first light-receiving means and a plurality of second light-receiving means arranged on the substrate, wherein the plurality of first optical devices and the plurality of first light-receiving means are positionally opposite to each other respectively and are arranged in a first side area and a second side area opposite to each other on the substrate, respectively, the plurality of second optical devices and the plurality of second light-receiving means are positionally opposite to each other respectively and are arranged in a third side area and a fourth side area opposite to each other on the substrate, respectively; the light source is located at a convergence of the first side area and the fourth side area, the third optical device is located at a convergence of the first side area and the third side area;

the light source emits light rays towards the first side area, the first optical device reflects light rays to a corresponding first light-receiving means and transmits light rays to an adjacent first optical device away from the light source; the third optical device reflects light rays to the plurality of second optical devices, the second optical device reflects light rays to a corresponding second light-receiving means and transmits light rays to an adjacent second optical device away from the third optical device;

the touch screen further comprising control means, the control means being in signal connection with the plurality of first light-receiving means and the plurality of second light-receiving means respectively for determining positional information of a touch point according to light receiving results of the plurality of first light-receiving means and the plurality of second light-receiving means, wherein the plurality of first optical devices are transflective optical devices, a second optical device in the third side area farthest from the third optical device is a total reflective optical device, the remaining second optical devices are transflective optical devices, the third optical device is a total reflective optical device.

12. A manufacturing method of a touch screen, the touch screen comprising a substrate and a plurality of first optical devices, a plurality of second optical devices, a light source, a third optical device, a plurality of first light-receiving means and a plurality of second light-receiving means arranged on the substrate, wherein the plurality of first optical devices and the plurality of first light-receiving means are positionally opposite to each other respectively and are arranged in a first side area and a second side area opposite to each other on the substrate, respectively, the plurality of second optical devices and the plurality of second light-receiving means are positionally opposite to each other respectively and are arranged in a third side area and a fourth side area opposite to each other on the substrate, respectively; the light source is located at a convergence of the first side area and the fourth side area, the third optical device is located at a convergence of the first side area and the third side area;

the light source emits light rays towards the first side area, the first optical device reflects light rays to a corresponding first light-receiving means and transmits light rays to an adjacent first optical device away from the light source; the third optical device reflects light rays to the plurality of second optical devices, the second optical device reflects light rays to a corresponding second light-receiving means and transmits light rays to an adjacent second optical device away from the third optical device;

the touch screen further comprising control means, the control means being in signal connection with the plurality of first light-receiving means and the plurality of second light-receiving means respectively for determining positional information of a touch point according to light receiving results of the plurality of first light-receiving means and the plurality of second light-receiving means, wherein the plurality of first optical devices are transflective optical devices, a second optical device in the third side area farthest from the third optical device is a total reflective optical device, the remaining second optical devices are transflective optical devices, the third optical device is a total reflective optical device, the manufacturing method comprising:

forming, on a substrate, an accommodating space for arranging the first optical devices, the second optical devices, the third optical device, the light source, the first light-receiving means and the second light-receiving means;

arranging the first optical devices, the second optical devices, the third optical device, the light source, the first light-receiving means and the second light-receiving means within the accommodating space;

mounting a glass cover plate on the substrate where the first optical devices, the second optical devices, the third optical device, the light source, the first light-receiving means and the second light-receiving means have been arranged to form a touch screen.

13. The touch screen according to claim 1, wherein as distances between the plurality of first optical devices and the light source increase, transmissivities of the plurality of first optical devices decrease successively and reflectivities of the plurality of first optical devices increase successively; as distances between the plurality of second optical devices and the light source increase, transmissivities of the plurality of second optical devices decrease successively and reflectivities of the plurality of second optical devices increase successively.

14. The touch screen according to claim 3, wherein as distances between the plurality of first optical devices and the light source increase, transmissivities of the plurality of first optical devices decrease successively and reflectivities of the plurality of first optical devices increase successively; as distances between the plurality of second optical devices and the light source increase, transmissivities of the plurality of second optical devices decrease successively and reflectivities of the plurality of second optical devices increase successively.

15. The touch screen according to claim 4, wherein as distances between the plurality of first optical devices and the light source increase, transmissivities of the plurality of first optical devices decrease successively and reflectivities of the plurality of first optical devices increase successively; as distances between the plurality of second optical devices and the light source increase, transmissivities of the plurality of second optical devices decrease successively and reflectivities of the plurality of second optical devices increase successively.

16. The touch screen according to claim 5, wherein as distances between the plurality of first optical devices and the light source increase, transmissivities of the plurality of first optical devices decrease successively and reflectivities of the plurality of first optical devices increase successively;

as distances between the plurality of second optical devices and the light source increase, transmissivities of the plurality of second optical devices decrease successively and reflectivities of the plurality of second optical devices increase successively.

17. The touch display apparatus according to claim 11, wherein the plurality of first optical devices are transflective prisms, a second optical device in the third side area farthest from the third optical device is a total reflective prism, the remaining second optical devices are transflective prisms, the third optical device is a total reflective prism.

18. The touch display apparatus according to claim 11, wherein the plurality of first optical devices are transflective coated lenses, a second optical device in the third side area farthest from the third optical device is a total reflective coated lens, the remaining second optical devices are transflective coated lenses, the third optical device is a total reflective coated lens.

19. The manufacturing method according to claim 12, wherein the plurality of first optical devices are transflective prisms, a second optical device in the third side area farthest from the third optical device is a total reflective prism, the remaining second optical devices are transflective prisms, the third optical device is a total reflective prism.

20. The manufacturing method according to claim 12, wherein the plurality of first optical devices are transflective coated lenses, a second optical device in the third side area farthest from the third optical device is a total reflective coated lens, the remaining second optical devices are transflective coated lenses, the third optical device is a total reflective coated lens.

\* \* \* \* \*